Oct. 23, 1923.
F. A. VEITH
DRILL DEVICE
Filed Jan. 5, 1920
1,471,714
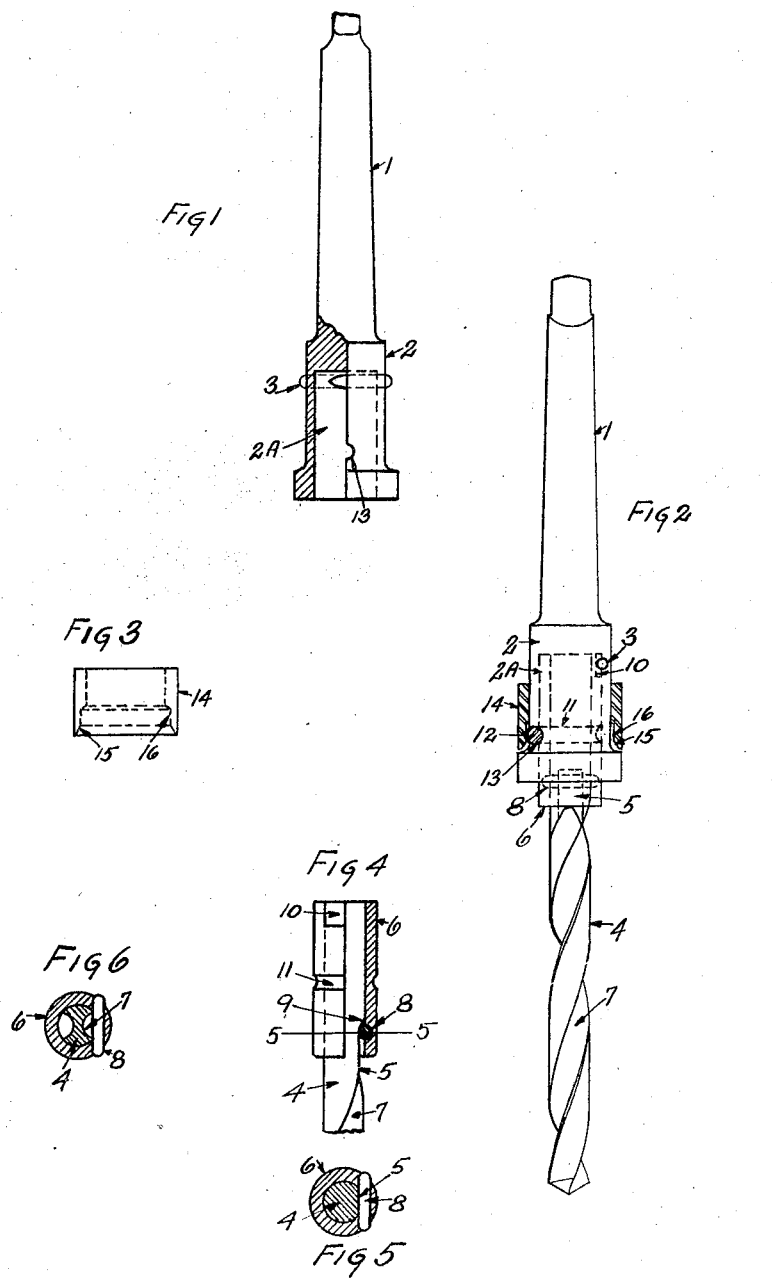
Inventor
Frank A. Veith
By 782 [?]
Attorney Patented Oct. 23, 1923.

1,471,714

UNITED STATES PATENT OFFICE.

FRANK A. VEITH, OF ERIE, PENNSYLVANIA.

DRILL DEVICE.

Application filed January 5, 1920. Serial No. 349,507.

*To all whom it may concern:*

Be it known that I, FRANK A. VEITH, a citizen of the United States, residing at Erie, in the county of Erie and State of Pennsylvania, have invented new and useful Improvements in Drill Devices, of which the following is a specification.

The object of the invention is to provide a convenient means for driving straight-shank drills. It is desirable to provide the smaller sizes at least of twist drills with straight shanks and the practice heretofore has been to drive these drills through a chuck gripping the shank. This has been faulty both in alining the drill and in holding it. In the present invention the drill is driven positively and maintained in a central position.

The invention is illustrated in the accompanying drawings as follows:—

Fig. 1 shows a side elevation of the chuck body, partly in section.

Fig. 2 a side elevation of the chuck partly in section.

Fig. 3 a side elevation of the locking sleeve for the chuck.

Fig. 4 a side elevation, partly in section, of the collet or holding sleeve for the drill.

Fig. 5 a section on the line 5—5 in Fig. 4 with the drill in place in the sleeve.

Fig. 6 a section through the sleeve on the line 5—5 in Fig. 4 with the flute of the drill in position in the sleeve.

1 marks the shank of the chuck, 2 the chuck or head, 2ª the chuck socket, and 3 a pin arranged through the chuck head and extending through the base of the socket 2ª forming a driving key.

A twist drill 4 is provided with a flat 5 which flat is formed in continuation of one of the flutes, or grooves 7.

The drill is placed in a collet or sleeve 6. The sleeve is provided with a pin 8 which extends through the interior of the sleeve adjacent to the wall and in such relation to the wall as to permit the insertion of the drill through the sleeve by moving one of the flutes along the key or pin 8. The drill, therefore, is inserted from the rear of the sleeve and when it has reached the end of the flute it passes on to the flat 5. The flat 5 terminates in a shoulder 9 which retains the drill in the sleeve. With the shoulder 9 in contact with the pin 8 the end of the drill should come flush with the end of the sleeve. The sleeve 6 has a flat 10 which when the sleeve or collet is placed in the socket 2ª engages the pin 3 and locks the sleeve against turning. A groove 11 is arranged in the sleeve 6 in position to be engaged by a ball 12 arranged in a ball retaining socket 13. This socket is so formed as not to permit the movement of the ball entirely through the socket but permit the ball to extend into the socket 2ª a sufficient distance to pass into the groove 11 locking the sleeve 6 in place. A locking collar 14 is mounted on the head preferably rotatively so that it may be grasped with the drill in motion. It has a cam surface 15 adapted to engage the ball 12 so as to force the ball inwardly and a locking surface 16 which with the locking collar 14 in its lower position locks the ball in its inner position, thus locking the sleeve 6 in the chuck socket.

With this structure it will be noted that the drill is positively locked against turning and that it is maintained in a central position and that the only change necessary with a standard drill is to extend the flat from the flute. As a matter of fact the flute itself may be made to form the flat but I prefer to extend the flat into the shank from the flute.

What I claim as new is:—

1. In a drill holder, the combination of a chuck socket; a sleeve having a drill holding socket arranged in said chuck socket; and a key in the sleeve, said key being in the direction of a chord of the circle formed by the inner surface of the sleeve and arranged along the wall of the sleeve and adapted to permit the insertion of a twist drill, the flute of the drill passing along the key.

2. In a drill holder, the combination of a sleeve; a key in the sleeve, said sleeve being arranged to receive a drill from the rear and the key being adapted to permit the insertion of the twist drill past the key by the passage of a flute along the key; and a chuck in which the sleeve is arranged, said chuck preventing a retraction of the drill from the sleeve.

3. In a drill holder, the combination of a sleeve; a key in the sleeve, said key and sleeve being adapted to receive a drill from the rear; a chuck in which the sleeve is arranged; and means for locking the sleeve against rotative and axial movement in the chuck, said chuck being arranged to prevent a retraction of the drill in the sleeve.

4. In a drill holder, the combination of a chuck socket, a drill having a shank extending from the twist portion, said shank having a flat extending from the flute in the twist portion; a sleeve arranged in said chuck socket; and a key in the sleeve, said sleeve and key permitting the insertion of the drill from the rear of the sleeve, the key permitting the passage of a flute and locking the sleeve with relation to the flat.

5. In a drill holder, the combination of a drill having a shank extending from the twist portion, said shank having a flat extending from the flute in the twist portion; a sleeve; a key in the sleeve, said sleeve and key permitting the insertion of the drill from the rear of the sleeve, the key permitting the passage of a flute and locking the sleeve with relation to the flat; and a chuck in which the sleeve is arranged, said chuck locking the drill against retraction.

6. In a drill holder, the combination of a drill having a shank extending from the twist portion, said shank having a flat extending from the flute in the twist portion; a sleeve; a key in the sleeve, said sleeve and key permitting the insertion of the drill from the rear of the sleeve, the key permitting the passage of a flute and locking the sleeve with relation to the flat; a chuck in which the sleeve is arranged, said chuck locking the drill against retraction; and means for locking the sleeve against rotative and axial movement in the chuck.

In testimony whereof I have hereunto set my hand.

FRANK A. VEITH.